United States Patent [19]

Kögler et al.

[11] Patent Number: 4,480,471
[45] Date of Patent: Nov. 6, 1984

[54] METHOD AND APPARATUS FOR MARKING THE UNBALANCES ONTO A ROTATING BODY, ESPECIALLY AN AUTOMOBILE WHEEL

[75] Inventors: Horst Kögler, Eulengasse; Peter Drust, Griesheim, both of Fed. Rep. of Germany

[73] Assignee: Gebr. Hofmann GmbH & Co. Kg, Maschinenfabrik, Darmstadt, Fed. Rep. of Germany

[21] Appl. No.: 368,766

[22] Filed: Apr. 15, 1982

[30] Foreign Application Priority Data

Apr. 16, 1981 [DE] Fed. Rep. of Germany ....... 3115609

[51] Int. Cl.³ ............................................. G01M 1/26
[52] U.S. Cl. ................................................... 73/462
[58] Field of Search ................. 72/463, 465, 466, 482, 72/483

[56] References Cited

U.S. PATENT DOCUMENTS

| | | | |
|---|---|---|---|
| 2,821,858 | 2/1958 | King | 73/462 |
| 2,947,175 | 8/1960 | King et al. | 73/483 |
| 3,062,058 | 11/1962 | Mika et al. | 73/485 |
| 3,091,970 | 6/1963 | Lannen | 73/483 |
| 3,213,690 | 10/1965 | Walton | 73/462 |
| 3,220,247 | 11/1965 | Goodman | 73/465 |
| 3,930,141 | 12/1975 | Koyama et al. | |
| 4,028,524 | 6/1977 | Moll et al. | 73/462 |
| 4,055,683 | 10/1977 | Gusarov et al. | 73/462 |
| 4,191,055 | 3/1980 | Orem et al. | 73/462 |
| 4,202,218 | 5/1980 | Toriselli | 73/487 |
| 4,341,119 | 7/1982 | Jackson et al. | 73/462 |

FOREIGN PATENT DOCUMENTS

| | | |
|---|---|---|
| 1798476 | 4/1959 | Fed. Rep. of Germany . |
| 1648520 | 5/1978 | Fed. Rep. of Germany . |
| 46841 A/77 | 12/1978 | Spain . |
| 860847 | 2/1961 | United Kingdom . |
| 932390 | 6/1961 | United Kingdom . |

OTHER PUBLICATIONS

German-Language "Hofmann Report No. 37," Aug. 1976.
Hofmann Report AWS-E 4.10/4.13/4/15 entitled, "Automatic Balancing Machine for Universal Electric Motor Armatures."
Hofmann Report entitled "Automatic Balancing of Universal Electro-Motor Armatures", Series AWS-E4.

Primary Examiner—James J. Gill
Attorney, Agent, or Firm—Fleit, Jacobson, Cohn & Price

[57] ABSTRACT

A method and an apparatus for marking the amount and location of unbalance on a rotatable body, such as a vehicle wheel. The apparatus uses a conventional system for determining the amount and location of unbalance in the body. A marking device is actuated to mark one or both sides of the body with a mark or marks representative of the amount and location of determined unbalance. The beginning and ending points of the mark can be representative of the beginning and end points of the correction mass to be applied to the body. The marks also can be representative of the predetermined weights of correcting masses to be applied to the body. Application of marks representative of the amount and location of unbalance to the bodies provides a visual indicator that facilitates subsequent check of the correct application of unbalance correction masses to the body.

23 Claims, 1 Drawing Figure

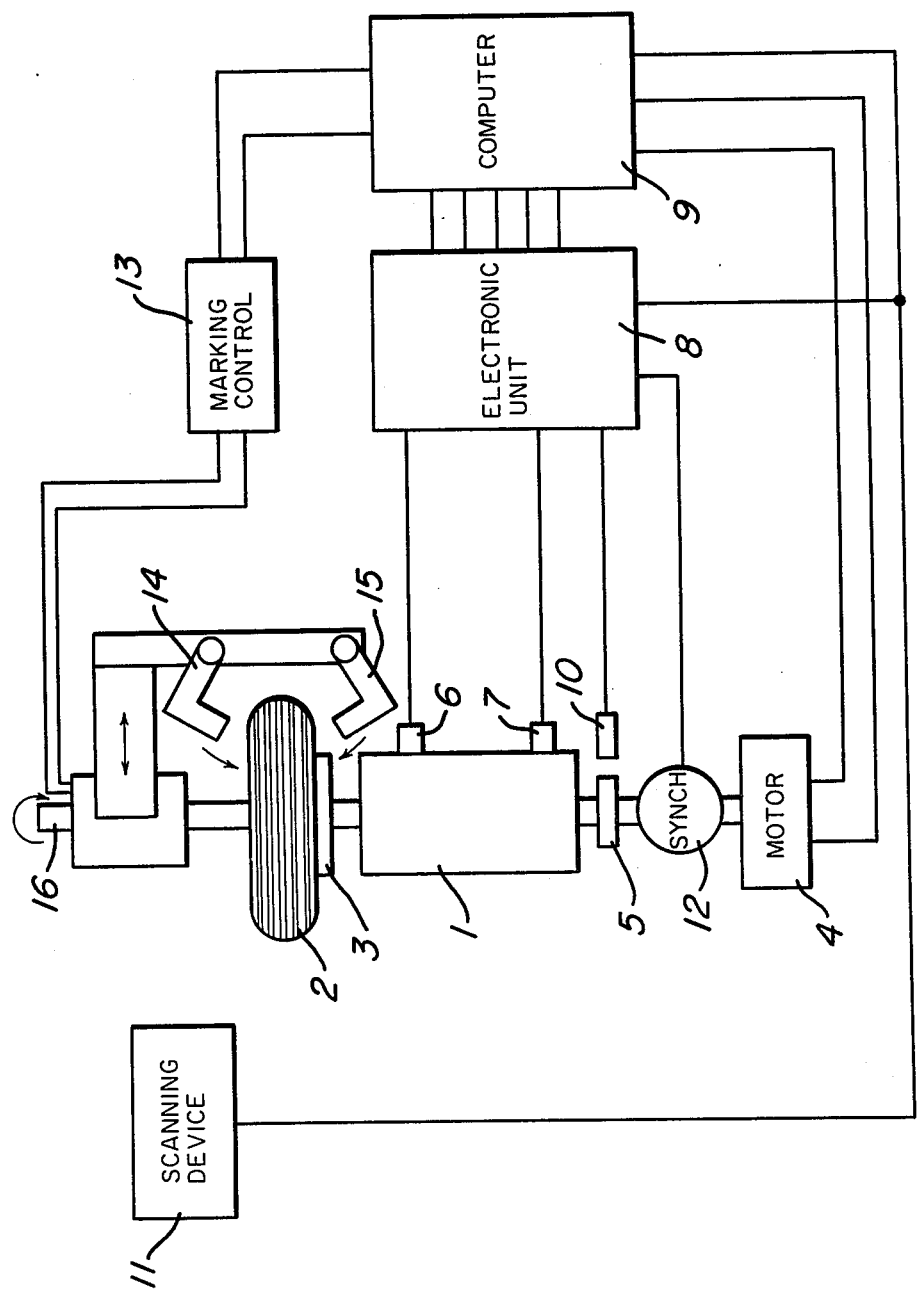

METHOD AND APPARATUS FOR MARKING THE UNBALANCES ONTO A ROTATING BODY, ESPECIALLY AN AUTOMOBILE WHEEL

BACKGROUND OF THE INVENTION

This invention relates to a method and an apparatus for marking unbalance on a rotatable body. More particularly, the invention provides an apparatus and method for marking the amount and location of mass that must be added to correct the unbalance of a tire mounted on a rim.

DESCRIPTION OF THE PRIOR ART

For balancing autombile wheels in two planes, it is known to determine the unbalance of the wheel in a measuring station, and to correct the unbalance by adding balance weights in two following correction stations. For this purpose, the wheel is first indexed automatically to the correction position of the first plane. The wheel, provided with the balance weights, is transported by grips to the next correction station and turned over. Then, the wheel is indexed automatically to the correction position of the second plane and corrected.

Balancing machines of this type are quite expensive in every respect, and, indeed, require a large installation area, which is often not available in the transport line of an automobile assembly line. Also, these machines are not readily adaptable to handling wheels of varying sizes.

Further, balancing machines are known (see, for instance, "Hofmann Report No. 37", published in Germany by Gebr. Hofmann GmbH and Co. KG, Pfungstedt, FRG, in 1976) that determine the unbalance in two planes in a measuring station and mark the locations of unbalance in the two planes on the tire by means of a marking device. With these machines, balancing is carried out in the following correction station where the wheel is placed on rollers and turned manually to the respective location by the operator. The balance weights to be used, as to the amount of unbalance determined, are indicated on different portions of a weight box containing separate storage bins for different sized weights so that the operator can take the weights and manually apply them at the unbalance locations previously marked. The tire to be balanced is not marked with the amount of weight to be added.

Operation of these machines requires skilled personnel, as the balance weights are inserted in two planes. This has to be carried out carefully to avoid phase errors. Furthermore, subsequent checks are quite difficult as the data of amount and location of unbalance are neither stored, nor recorded.

Furthermore, German Utility Pat. No. 1, 798,476 describes an apparatus for marking automobile tires, in which the tire is marked by coloured tape, depending on the location of unbalance and the mount of unbalance, which amount is associated with three possible gradations. These marks are applied directly to the sidewalls of the tire and can get lost easily during transport, all the more since the marks might be provided at different positions on the circumference of the wheel independent of its dimensions. This method no longer meets actual requirements as these three gradations serve for classification only, and are too inaccurate for subsequent correction.

SUMMARY OF THE INVENTION

Therefore, it is an object of the present invention to avoid the disadvantages of the previously known apparatus and methods. It is a further object to provide a method and an apparatus that ensures both fast marking of amount and location of unbalance on a wheel, and the capability to subsequently check the accuracy of placement of the balance weight or weights.

It is known from the previously cited "Hofmann Report No. 37" to determine the type of wheel with respect to rim diameter, rim width, and tire offset. Determination of these characteristics serves only for setting the electronic unit of the unbalance measuring equipment as to the type of wheel identified. The present invention, of course, can make use of this principle and use the characteristics of determining the wheel type for radially controlling the marking device with regard to the automobile wheel to be marked.

With the present invention, it is possible to provide a relatively permanent mark or marks as to the amount and location of unbalance, depending on the dimensions of the rotating body, so that subsequent mass correction can be carried out within the range of the transport line in the user's works and in a way meeting ergonomic requirements.

The mark is provided on the rim, especially in the range of the rim flange of the automobile wheel, and preferably by a sprayer or a laser so as to permit subsequent checks whether the weight of the attached mass and its position conform to the data determined.

The mark can be applied in gradations, for instance 5 or 10-gm gradations representative of commercially available balance weights. It, however, is also possible to provide non-graded marks so that the correction mass required can be cut off manually or automatically from a tape or coil and attached to the marked position.

The measured and marked wheel is then removed and transported to the next station without running the danger of losing the unbalance data applied thereupon. The actual balancing, by insertion or application of balance weights, is then carried out within the transport line at an appropriate position and in an ergonomically favorable form, as requested by the operator. Since the data of amount and location of unbalance are applied at a given radius of the rotating body, checks of the correction process are subsequently possible.

The invention, and its objects and advantages, will become more apparent in the detailed description of the preferred embodiment hereinafter presented.

BRIEF DESCRIPTION OF THE DRAWING

The preferred embodiment is shown in the accompanying schematic diagram, which is to give a more detailed description of the invention.

DESCRIPTION OF THE PREFERRED EMBODIMENT

The present description will be directed in particular to elements forming part of, or cooperating more directly with, the present invention. Elements not specifically shown or described herein are understood to be selectable from those known in the art.

In the following description, mention will be made of marking the amount and location of unbalance on a rotatable body. It should be appreciated that the invention can be used to mark either the amount and location of unbalance, or the location and mass of correcting weights that should be added to the wheel in order to compensate for the measured unbalance.

The rotating body 2, in this case an automobile wheel (a tire mounted on a rim), is clamped on a clamping unit 3, such as a unit of the type described in Spanish Pat. No. 469,091, U.S. Pat. No. 4,191,055, or, U.S. Pat. No. 4,202,213. The clamping unit is associated with a conventional balancing machine 1 such as a machine of the type described in U.S. Pat. No. 4,191,055. Drive of the balancing machine is by a driving motor 4, which is coupled to the balancing spindle via a drive shaft. Transmission can also be via a flat belt 5 arranged between the driving motor 4 and the balancing spindle. Vibrations generated by unbalance in the rotating wheel are received by the transducers 6 and 7, which operate either on the basis of displacement-measuring or force-measuring principle. The output data of the transducers 6 and 7 are passed to conventional electronic unit 8, such as a unit of the type described in United Kingdom Pat. No. 860,847. A scanning device 10 generates a reference signal in phase with the rotation of the spindle of the balancing machine 1. For this purpose, the scanning device, for example, scans cams of the machine spindle. Use however, may also be made of fixed phase reference generators or similar equipment. An electronic unit 8, which is similar to a unit of the type described in United Kingdom Pat. No. 860,847, then determines the amount and location of unbalance for the correction planes selected, which is carried out on the basis of phase-controlled rectification.

The unbalance data are passed to a microcomputer 9 and, possibly, to a conventional display unit. The microcomputer receives signals from the scanning or ring sensing device 11 and transmits control signals to drive motor 4 and marking control 13. The transmitted control signals are determined by the sensed values. The drive motor 4 rotates the wheel to position the location or locations to be marked under the marking devices 14 and 15.

The microcomputer 9 and the electroninc unit 8 are fed with the measured data of the scanning device 11, which can be similar to the wheel type identifying unit (orientation station) described in the "Hofmann Report No. 37" or the device described in U.S. Pat. No. 3,930,141, so as to take into account variations in the dimensions of the rotating bodies 2. The scanning device 11, therefore, determines the dimensions of the rotor to be balanced, especially by means of sensors provided in the measuring station or another preceding station.

To check the position of a supported wheel, the electronic unit 8 is further connected with a synchro 12 or another similar device of the type described in DE-PS No. 1,648,520 or U.S. Pat. No. 3,213,690.

The location voltages control the drive motor 4 to index the wheel to the location of unbalance, and the following indexing voltage controlling orientation to zero or to the initial position, are fed to the drive motor 4 by the microcomputer 9.

The microcomputer 9 furthermore controls the marking device control unit 13 depending on the amount and location of the unbalance and the rotor dimensions determined. The control unit 13 can be used for both marking devices 14 and 15, or each of these devices 14 and 15 is provided with a control unit 13 of its own and with the corresponding actuators. A suitable control unit 13 and suitable marking devices 14 and 15 are described in United Kingdom Pat. No. 932,390.

The marking devices 14 and 15 are radially movable relative to the rotating body 2 in order to be adjusted to predetermined radii of the rotating body 2. The devices 14 and 15, furthermore, can be swivelled about the axis 16, which can be omitted if the rotating body 2 is turned instead below the fixed marking devices 14 and 15 during the marking process.

The marking devices 14 and 15, which are mounted onto the balancing machine 1, are completely movable about an axis nearly vertical to the axis of rotation of the rotor so as to simplify loading and unloading of the machine. Suitable devices 14 and 15 are sprayers, a laser, or similar devices, which mark, especially on automobile wheels, in the vicinity of or on the rim flange.

The mark, for example, is either a line, the length of which conforms to the amount of unbalance determined, or a number, with a striking point of the mark or number showing the location of determined unbalance. The amount is either marked in gradations representative of available correction masses or a mark directly proportional to the sensed unbalance.

With the preferred embodiment, only the beginning and the end points for the correction mass or masses to be attached are marked by means of the double marking device, the angles of which are adjusted automatically depending on the amount of unbalance determined.

Subsequently, it is quite clear that an advantage of the inventive method and apparatus consists in marking the location and amount of unbalance on the rotor, thus permitting mass correction to be carried out at any place along the transport line of the user. It is equally possible to subsequently check the correct application of the correction mass or masses.

It should be readily apparent that this invention is not only applicable to marking automobile wheels, but, in general, is applicable to marking all types of rotating bodies, such as grinding wheels.

Previously, a specific embodiment of the present invention has been described. It should be appreciated, however, that this embodiment has been described for the purposes of illustration only, without any intention of limiting the scope of the present invention. Rather, it is the intention that the present invention be limited only by the appended claims.

What is claimed is:

1. A method for marking unbalances on a rotatable body, with said body being provided with marks at angular locations depending on the amount and location of unbalance determined by unbalance measuring equipment, said method comprising:
   determining dimensions of a body to be marked;
   rotating the body and determining the amount and location of unbalance;
   moving a marking device about an axis of rotation of the body; and
   providing at least one mark at a predetermined and radially controlled radius on the body depending on the dimensions of the body, with said at least one mark representing the amount and location of the unbalance determined, said at least one mark representing the magnitude of a correction mass to be attached to the body and said at least one mark defining a location for placement of the edge of the correction mass.

2. A method according to claim 1, wherein the body is a wheel having a tire mounted on a rim, said method determining dimensions of the rim and providing a mark on the rim.

3. A method according to claim 2, in which the mark is provided on the rim flange.

4. A method according to one of claims 1, 2 or 3, in which the mark is applied by spraying.

5. A method according to claim 4, in which the length of the mark conforms to the weight of the correction mass to be attached to the body.

6. A method according to one of claims 1, 2 or 3, in which the length of the mark conforms to the weight of the correction mass to be attached to the body.

7. A method according to claim 6, in which beginning and end points of the mark represent the weight of the correction mass to be attached.

8. A method according to claim 6, in which beginning and end points of the mark represent the weight of the correction mass to be attached.

9. A method according to one of claims 1, 2, or 3, in which a number of marks is applied.

10. A method according to claim 9, wherein the number of marks is determined according to available correction masses.

11. A method according to claim 1, in which the mark represents the directly proportional value of the amount of unbalance, and in which the unbalance location is a striking point of the mark.

12. An apparatus for marking a rotatable body at least one angular locations depending on the amount and location of determined unbalance of the body, said apparatus comprising:
  first means for rotatably supporting and for rotating a body to be marked;
  second means for determining the amount and location of unbalance in the body when rotating;
  means for sensing at least one dimension of said body; and
  means for applying to the body at least one mark representative of the amount and location of unbalance, said means for applying being movable about an axis of rotation of the body when said body is mounted on said first means and said means for applying being responsive to said means for sensing so that the mark is provided on a predetermined portion of the body and represents the amount and location of the unbalance determined, wherein said at least one mark represents the magnitude of a correction mass to be attached to the body and said at least one mark defines a location for placement of the edge of the correction mass.

13. An apparatus according to claim 12, wherein the body is a wheel having a rim, said sensing means sensing the diameter of the rim, said applying means applying the mark to the rim.

14. An apparatus according to claim 12 or 13, in which the means for sensing is a scanning device, said first and said second means having components thereof preset by said scanning device.

15. An apparatus according to claim 13, in which the mark is provided on the rim flange.

16. An apparatus according to claim 12 or 13, in which the means for applying sprays a mark on the body.

17. An apparatus according to claim 12 or 13, in which the means for applying includes a laser.

18. An apparatus according to claim 12 or 13, in which the length of the mark conforms to the weight of a correction mass to be attached to the body.

19. An apparatus according to claim 13, in which beginning and end points of the mark marked on the body conform to the weight of the correction mass to be attached to the body.

20. An apparatus according to claim 12 or 13, in which a plurality of marks are applied to the body, the number of marks provided conforming to predetermined available weights of correction masses.

21. An apparatus according to claim 12 or 13, in which the mark is directly proportional to the value of the amount of unbalance, and in which the unbalance location is indicated by a striking point of the mark.

22. An apparatus according to either one of claim 12 or 13, in which said means for applying comprises one marking device for each of two correction planes of said body.

23. An apparatus according to claim 12 or 13, in which said means for applying comprises a double marking device having a marking device for each of two correction planes of the body, the angle of each marking device being controlled so as to conform to the magnitude of the correction mass to be attached to the body.

* * * * *